(12) United States Patent
Dienel et al.

(10) Patent No.: US 8,746,064 B2
(45) Date of Patent: Jun. 10, 2014

(54) MICROMECHANICAL SENSOR HAVING A BANDPASS CHARACTERISTIC

(75) Inventors: Marco Dienel, Oederan (DE); Alexander Sorger, Oelsnitz (DE); Jan Mehner, Neukirchen (DE)

(73) Assignee: Fibercheck GmbH, Chemnitz (DE)

( * ) Notice: Subject to any disclaimer, the term of this patent is extended or adjusted under 35 U.S.C. 154(b) by 305 days.

(21) Appl. No.: 13/217,639

(22) Filed: Aug. 25, 2011

(65) Prior Publication Data

US 2012/0048022 A1 Mar. 1, 2012

(30) Foreign Application Priority Data

Aug. 26, 2010 (EP) .................................. 10401151

(51) Int. Cl.
*G01P 15/097* (2006.01)
*G01P 15/125* (2006.01)

(52) U.S. Cl.
USPC ...................... 73/504.12; 73/514.32; 73/651

(58) Field of Classification Search
USPC ............. 73/504.12, 504.14, 514.32, 649, 651
See application file for complete search history.

(56) References Cited

U.S. PATENT DOCUMENTS

| | | | | |
|---|---|---|---|---|
| 2,906,117 | A | * | 9/1959 | Kennard, Jr. ..................... 73/651 |
| 5,775,472 | A | * | 7/1998 | Osterberg et al. ............ 188/378 |
| 5,856,722 | A | | 1/1999 | Haronian |
| 6,487,864 | B1 | * | 12/2002 | Platt et al. ........................ 62/3.2 |
| 2003/0200807 | A1 | * | 10/2003 | Hulsing, II .................. 73/514.01 |
| 2004/0123661 | A1 | * | 7/2004 | Painter et al. .............. 73/504.13 |
| 2007/0214890 | A1 | * | 9/2007 | Mukherjee ................. 73/514.29 |

FOREIGN PATENT DOCUMENTS

JP 2000131134 A 5/2000

OTHER PUBLICATIONS

Forke, et al.: "Fabrication and characterization of a force coupled sensor-actuator system for adjustable resonant low frequency vibration detection", Sensors and Actuators A, Elsevier Sequoia S.A., Lausanne, CH, vol. 145-146, Jul. 2008, pp. 245-256.
Dai, et al.: "Simulation and fabrication of HF mircroelectromechanical bandpass filter", Microelectronics Journal, Mackintosh Publications Ltd. Luton, GB, vol. 38, No. 8-9, Aug. 2007, pp. 828-833.

* cited by examiner

*Primary Examiner* — Peter Macchiarolo
*Assistant Examiner* — Rose M Miller
(74) *Attorney, Agent, or Firm* — Laurence A. Greenberg; Werner H. Sterner; Ralph E. Locher

(57) ABSTRACT

The invention relates to a micromechanical sensor having at least two spring-mass damper oscillators. The micromechanical sensor has a first spring-mass-damper oscillating system with a first resonant frequency and a second spring-mass-damper oscillating system with a second resonant frequency which is lower than the first resonant frequency. The invention also relates to a method for detection and/or measurement of oscillations by means of a sensor such as this, and to a method for production of a micromechanical sensor such as this. The first and the second spring-mass-damper oscillating systems have electrodes which oscillate in a measurement direction about electrode rest positions with electrode deflections which are equal to or proportional to deflections of the spring-mass-damper oscillators. The systems are coupled to one another by means of at least one electrostatic field, which acts on the electrodes, forming at least one capacitance with the capacitance being governed by at least one electrode area and by at least one electrode separation and/or an electrode coverage.

15 Claims, 5 Drawing Sheets

MICROMECHANICAL SENSOR HAVING A BANDPASS CHARACTERISTIC

BACKGROUND OF THE INVENTION

Field of the Invention

The invention relates to a micromechanical sensor having at least two spring-mass damper oscillators which can be excited by a common external oscillation, with the micromechanical sensor having a first spring-mass-damper oscillating system with a first resonant frequency and a second spring-mass-damper oscillating system with a second resonant frequency which is lower than the first resonant frequency. The invention also relates to a method for detection and/or measurement of oscillations by means of a sensor such as this, and to a method for production of a micromechanical sensor such as this.

Sensors of this generic type are used, for example, as structure-borne sound sensors for monitoring machines for wear and faults. In order to allow an acoustic signal to be detected to be evaluated well, it is advantageous for a large oscillation amplitude of the oscillators in the sensor to be produced from the acoustic input signal. Large oscillation amplitudes are achieved by resonant oscillators with high Q-factors. However, in the case of an oscillator having a high Q-factor, the desired large oscillation amplitude is, however, achieved only at the resonant frequency, and the bandwidth in which a resonant high oscillation amplitude is excited becomes narrower the higher the Q-factor is.

In order to allow acoustic signals to be detected in a wider frequency range, sensors are constructed with arrays of oscillators which have different resonant frequencies in a frequency range to be analyzed. By way of example, one such sensor array is described in the document JP 2000131134 A. Sensor arrays allow large oscillation amplitudes to be produced at the same time by individual oscillators and, associated with this, good sensor signals, while on the other hand also allowing a wide bandwidth to be achieved by the adjacent arrangement of narrow frequency ranges. Sensor arrays have the disadvantage that they have a large number of elements, with the sensor having complex structures and extensive evaluation electronics, and with the production of the sensor in consequence also being associated with high costs. A further disadvantage of such sensors is that the resonant oscillators have a long stabilization time and they are therefore less sensitive to a sequence of pulses at short time intervals than to periodic input signals. A further problem which often affects sensors is the presence of mechanical interference signals, whose amplitude in general increases at low frequencies. The cited document attempts to absorb undesirable low-frequency oscillations by means of dummy resonators.

BRIEF SUMMARY OF THE INVENTION

The object of the present invention is to specify a sensor for detection of acoustic signals or vibration, which is less susceptible to interference relating to low-frequency input signals, produces a sufficiently high signal for a given input signal, can be used for a bandwidth of different signal frequencies, can be manufactured on a small sensor area with low costs, and is also suitable for detection of events at short time intervals. A further object of the present invention is to propose a measurement method for operation of a sensor such as this, and a production method for manufacturing sensors such as these.

The object is achieved by a micromechanical sensor of the generic type mentioned above, with the first and the second spring-mass-damper oscillating systems being designed such that they oscillate in-phase in a frequency range below the second resonant frequency; wherein the first and the second spring-mass-damper oscillating systems have electrodes which oscillate in a measurement direction about electrode rest positions with electrode deflections which are equal to or proportional to deflections of the spring-mass-damper oscillators; wherein the first and the second spring-mass-damper oscillating systems are coupled to one another by means of at least one electrostatic field, which acts on the electrodes, forming at least one capacitance with the capacitance being governed by at least one electrode area and by at least one electrode separation and/or an electrode coverage, with the electrode deflections influencing the electrode separation and/or the electrode coverage and thus influencing the magnitude of the capacitance, and with the influences of the first and second spring-mass-damper oscillating systems on the magnitude of the capacitance being compensated for in the case of an in-phase oscillation.

In the simplest case, the two spring-mass-damper oscillating systems each consist of one oscillator. However, an oscillating system may also be formed from two or more oscillators. For example, it may be advantageous for the oscillating system to be formed from a plurality of oscillators because this allows relatively small oscillators with higher resonant frequencies to be produced.

It is necessary for the operation of the sensor to detect the movements of the oscillators. Electrostatic electrodes are provided for this purpose, which form an electrostatic field by means of a relationship with the fixed-position electrostatic electrode in an electronic circuit. It is particularly simple, cost-effective and technically advantageous to detect an electrostatic field as a voltage. The invention therefore proposes that electrostatic electrodes preferably be used. Other signal transducers, for example piezoresistive signal transducers may, however, also be used with greater complexity to detect oscillations.

The electrodes are either in the form of components of the spring-mass-damper oscillators and in this case carry out the oscillations of the oscillators as well, or the electrodes are physically separated from the oscillators. If the electrodes are physically separated from the oscillators, they are coupled to the oscillators, however, such that their oscillation amplitude is mechanically coupled to the oscillation amplitude of the spring-mass oscillators. The mechanical coupling allows the oscillation amplitude to be stepped down or up in a desired ratio, for example by means of a lever arrangement with different lever lengths.

The first and the second spring-mass-damper oscillating systems are, according to the invention, coupled to one another, and the coupling is provided such that the electrodes in the two oscillating systems and the corresponding opposing electrodes are each electrically connected to one another. In principle, other couplings, for example mechanical couplings, are also possible in addition to electrostatic coupling by means of capacitances. However, electrostatic couplings can be implemented easily and flexibly, and they are therefore used by preference. Fixed-position electrodes are associated with the oscillating electrodes. The spatial arrangement of the moving and fixed-position electrodes with respect to one another is used to form capacitances and to define the measurement direction. By way of example, plate capacitors are formed by arranging flat electrodes parallel. The capacitance of capacitors formed in this way is varied by the oscillation of the oscillators and variation of the electrode separation resulting from this, or variation of the electrode coverage, or a combination thereof. The capacitance of the sensor is the sum of the capacitance elements of the first and second spring-mass-damper oscillating systems. The magnitude of the change in the capacitance element as a function of the mechanical excitation is referred to as the capacitive sensitivity of the spring-mass-damper oscillating system.

The mechanical reaction of oscillators to an excitation frequency is in contrast referred to as the sensitivity of the oscillators. This depends in particular on the resonant frequency of the oscillators. Close to the resonant frequencies of two different oscillators, the mechanical sensitivities and phase angles are highly dependent on the specific excitation frequency. At an excitation frequency between the two resonant frequencies, the two oscillators oscillate mechanically as far as being in anti-phase, and capacity as far as being in-phase. At an excitation frequency which is well away from the resonant frequencies, the excitation frequency in contrast causes a mechanical in-phase oscillation of the two oscillators. The invention makes use of this in-phase oscillation to form a mechanical bandpass filter, which carries out a capacitive antiphase oscillation during the mechanical in-phase oscillation and emits a small capacitance change, and a large capacitance change in the vicinity of the resonant frequencies, by subtraction of the capacitance elements of the two spring-mass-damper oscillating systems.

The interconnection of two oscillating systems to form a bandpass filter is, however, dependent on the two oscillating systems jointly governing the bandpass filter to the same extent. However, at frequencies well below the resonant frequency, similar oscillators have different mechanical sensitivities; the oscillator with a low-frequency resonant frequency in this case has greater mechanical sensitivity than the oscillator with the higher resonant frequency. In the sensor according to the invention, the influence of both oscillating systems on the joint capacitance is compensated for by a design measure. In the sensor according to the invention, both oscillating systems therefore carry out a capacitive antiphase oscillation at low frequencies during the mechanical in-phase oscillation. In this case, the magnitude of the capacitance of both oscillating systems is, however, modulated to the same extent, but with inverted mathematical signs. This means that the total capacitance scarcely changes during an in-phase oscillation, and the capacitance is substantially constant.

At frequencies well above the resonant frequencies of the two oscillating systems, the sensitivities rapidly decay, and the behavior is in general of lesser importance at high frequencies. Low and high frequencies are masked out in the sensor according to the invention by the in-phase oscillation and the natural sensitivity behavior.

In the frequency range in which the resonant frequencies of the two oscillating systems are located, the sensor has high sensitivity, however, with a bandpass characteristic. The bandpass characteristic of the sensor is governed by the sensitivity of the first spring-mass-damper oscillating system, by the sensitivity of the second spring-mass-damper oscillating system, and by the difference between the sensitivities of the two spring-mass-damper oscillating systems. The sensor according to the invention has advantageous characteristics. The evaluation electronics for the sensor can be optimized for the useful signals, since the low-frequency excitation frequencies, which have a particularly disturbing effect in practice, have already been filtered out in the sensor. In consequence, the sensor according to the invention is insensitive to interference, and has high sensitivities over a broad operating frequency range. The high frequency selectivity is achieved even with low Q-factors—because of the short stabilization time.

In a simple first embodiment, the sensor according to the invention is distinguished in that the micromechanical sensor has a fixed-position comb electrode with fixed-position comb structures, wherein the first and the second spring-mass-damper oscillating systems have moving comb structures which engage in the fixed-position comb structures, with the moving comb structures of the first spring-mass-damper oscillating system being arranged on a second side of the fixed-position comb structures, and with the moving comb structures of the second spring-mass-damper oscillating system being arranged on a first side of the fixed-position comb structures, and with all the moving comb structures being electrically conductively connected to one another.

In this embodiment, comb electrodes are used as electrodes. Comb electrodes have a large surface area per available space, because of a multiplicity of comb structures. Micromechanical production technologies also allow comb structures to be produced without any problems, as a result of which comb electrodes are widely used in micromechanical components. The proposed sensor has a fixed-position comb electrode in which both the moving comb structures in the first spring-mass-damper oscillating system and the comb structures in the second spring-mass-damper oscillating system engage. In this case, the comb structures in the first spring-mass-damper oscillating system are arranged on a second side of the fixed-position comb structures, and the moving comb structures in the second spring-mass-damper oscillating system are arranged on the first side of the fixed-position comb structures. This reversed arrangement means that, when the first and second spring-mass-damper oscillating systems oscillate in-phase, separation between the comb structures in the second spring-mass-damper oscillating system and the fixed-position comb structures decreases when the electrode separation between the comb structures in the first spring-mass-damper oscillating system and the fixed-position comb structure increases. This arrangement changes a mechanical in-phase oscillation to a capacitive antiphase oscillation.

The fixed-position comb electrode extends over both the oscillating systems that are used. In addition, the comb structures in the two oscillating systems are electrically conductively connected to one another. This results in a capacitance which is governed by the arrangement of the moving comb structures in the first and the second spring-mass-damper oscillating systems and the fixed-position comb electrode with respect to one another. In this exemplary embodiment of the invention, the number of comb structures is used for the compensation, as mentioned in claim 1, for the influences of the first and second spring-mass-damper oscillating systems on the magnitude of the capacitance, that is to say compensation for the capacitive sensitivities. By way of example, the first spring-mass-damper oscillating system may have a greater number of comb structures than the second spring-mass-damper oscillating system.

In a second, extended exemplary embodiment of the invention, the micromechanical sensor is designed such that the micromechanical sensor has the fixed-position comb electrode with fixed-position comb structures and a further fixed-position comb electrode with further fixed-position comb structures, wherein the moving comb structures of the first and of the second spring-mass-damper oscillating systems engage between the fixed-position comb structures and the further fixed-position comb structures, with the moving comb structures of the first spring-mass-damper oscillating system being arranged on the second side of the fixed-position comb structures and on a first side of the further fixed-position comb structures and with the moving comb structures of the second spring-mass-damper oscillating systems being arranged on the first side of the fixed-position comb structures and on the second side of the further fixed-position comb structures, and with all the moving comb structures being electrically conductively connected to one another.

In this embodiment, not only do the oscillators form a capacitance with the fixed-position comb electrode, but instead of this they additionally form a further capacitance with the further fixed-position comb electrode. The moving comb structures of the oscillators move between the fixed-position comb structures and the further fixed-position comb structures. The capacitance of a plate capacitor is inversely proportional to the electrode separation, that is to say in this specific case, it is inversely proportional to the separation between the fixed-position and moving comb structures. If the separation between the plates in the plate capacitor is short, the plate capacitor has a high capacitance. The use of two electrodes, the fixed-position comb electrode and the further fixed-position comb electrode, results in the oscillator being at a short distance from either the fixed-position or the further fixed-position comb electrode, and having a high capacitance.

The use of a further fixed-position comb electrode in a micromechanical sensor results on the one hand in a simplification and improvement in the signal evaluation on the sensor, because of the formation of a differential capacitor, while on the other hand the formation of the further fixed-position comb electrode results in increased manufacturing effort, since both the fixed-position comb electrode and the further fixed-position comb electrode must be insulated from the respective other fixed-position comb electrode. The more complex production may, for example, comprise the provision of an additional wiring level for the further fixed-position comb electrode, which is not at the same level as that of the oscillators and the fixed-position comb electrode.

In a further preferred embodiment of the micromechanical sensor according to the invention, said sensor is designed such that the micromechanical sensor has a first fixed-position comb electrode with first fixed-position comb structures and a second fixed-position comb electrode with second fixed-position comb structures, between which the first and the second spring-mass-damper oscillating systems are arranged, with first moving comb structures of the first spring-mass-damper oscillating system being arranged on the second side of the first fixed-position comb structures, with second moving comb structures of the first spring-mass-damper oscillating system being arranged on a first side of the second fixed-position comb structures, with first moving comb structures of the second spring-mass-damper oscillating system being arranged on the first side of the first fixed-position comb structures, and with second moving comb structures of the second spring-mass-damper oscillating system being arranged on the second side of the second fixed-position comb structures.

In this embodiment, in addition to the moving comb structures, the oscillators also have second moving comb structures, with the first moving comb structures being involved in the formation of a first capacitance, and with the second moving comb structures being involved in the formation of a second capacitance. As already stated in the last exemplary embodiment, the capacitances in this exemplary embodiment are also in the form of a differential-capacitor arrangement. This means that an increase in the first capacitance results in a reduction in the second capacitance, and vice versa. In this exemplary embodiment, the second capacitances are provided using second moving comb structures. The additional second moving comb structures make it possible to provide both the fixed-position comb structures and the second fixed-position comb structures on the oscillator level. Production on one level allows a simpler manufacturing process than that used in the second exemplary embodiment, thus allowing the production costs for a sensor such as this to be kept low. A sensor having second moving comb structures need not necessarily be provided on one level. Extensions are also permissible, for example a combination of the exemplary embodiments described above, by further electrodes and further wiring levels.

In one preferred embodiment of the micromechanical sensors according to the invention, the first spring-mass-damper oscillating system has a greater number of fixed-position and moving comb structures than the second spring-mass-damper oscillating system. The influence of the first and second spring-mass-damper oscillating systems on the capacitance should be of equal magnitude. The first spring-mass-damper oscillating system has a higher resonant frequency than the second spring-mass-damper oscillating system. The first spring-mass-damper oscillating system in consequence has a smaller movement amplitude than the second spring-mass-damper oscillating system at excitation frequencies well below the resonant frequency. In the case of comb structures of the same type, the influence of the first spring-mass-damper oscillating system on the capacitance will be less than the influence of the second spring-mass-damper oscillating system, because of the weaker movement. The naturally small influence of the first spring-mass-damper oscillating system is compensated for by a greater number of comb structures in the sensor proposed here.

In one development of the micromechanical sensor according to the invention, the first spring-mass-damper oscillating system has at least two spring-mass-damper oscillators. As has already been described above, it is desirable for there to be a greater number of comb structures on the oscillator in the first spring-mass-damper oscillating system than on the oscillator in the second spring-mass-damper oscillating system; on the other hand, the oscillator in the first spring-mass-damper oscillating system, which has a higher resonant frequency, is in general smaller (less mass with the same spring stiffness) than the oscillator in the second spring-mass-damper oscillating system. In consequence, a further spring-mass-damper oscillator may be too small to provide the desired number of moving comb structures. In this case, it is also possible to provide two or more first spring-mass-damper oscillators, in which case comb structures which can be moved adequately overall can then be provided in the first spring-mass-damper oscillating system.

In a further alternative of the micromechanical sensor according to the invention, said micromechanical sensor is designed such that the micromechanical sensor in one of the spring-mass-damper oscillating systems has a mechanical coupling element and an electrostatic coupling electrode, with the mechanical coupling element being designed for stepping down or stepping up the oscillation amplitude of one spring-mass-damper oscillator in this spring-mass-damper oscillating system to a lower or higher oscillation amplitude of the electrostatic coupling electrode, and with the oscillation amplitude of the other spring-mass-damper oscillating system and of the electrostatic coupling electrode being of equal magnitude in the case of in-phase oscillation.

In this sensor, the different oscillation amplitudes of the oscillators in the two spring-mass-damper oscillating systems are not electrically matched to one another by means of different electrodes, but are mechanically matched via a lever mechanism. For example, the greater oscillation amplitude of the second spring-mass-damper oscillating system is stepped down by means of a lever to such an extent that the oscillation amplitude of the coupling electrode, which is connected to the second spring-mass-damper oscillator via a lever, is reduced to such an extent that the coupling electrode in the second spring-mass-damper oscillating system has the same amplitudes as the oscillator in the first spring-mass-damper oscillating system. Instead of stepping down the oscillation amplitude of the second spring-mass-damper oscillating system, it is also possible to step up the oscillation amplitude of the first spring-mass-damper oscillating system. The coupling of the first and second spring-mass-damper oscillating systems results in forces from both oscillating systems acting on the mechanical lever. A sensor signal on the lever could thus be obtained in a different way than the electrostatic manner proposed here. For example, a piezoresistive or optical signal transducer could be used here. A sensor having a mechanical coupling element can also be developed to form a differential-capacitor arrangement.

In another advantageous exemplary embodiment of the present invention, the micromechanical sensor is designed such that, in the case of the micromechanical sensor, at least one spring-mass-damper oscillator in the first spring-mass-damper oscillating system oscillates in a measurement direction on an oscillation plane, and wherein the second spring-mass-damper oscillating system has at least one spring-mass-damper oscillator which is rotated to a rotation angle with respect to the measurement direction on the oscillation plane, with the rotated spring-mass-damper oscillator having comb structures, which are parallel to the comb structures of the first spring-mass-damper oscillator, and a guide which allows it to oscillate in an oblique direction which is governed by the rotation angle, with the oscillation amplitude of the rotated spring-mass-damper oscillator in the case of an in-phase oscillation having a vector component in the measurement direction which is of equal magnitude to the oscillation amplitude of the spring-mass-damper oscillator in the first spring-mass-damper oscillating system.

In this embodiment, the greater mechanical sensitivity of the second spring-mass-damper oscillating system is reduced because the rotated arrangement of the comb structures results in only a portion of the movement of the oscillators being transferred to the movement of the comb structures in the measurement direction and in the second vectorial component of the oscillator movement, which is at right angles to the measurement direction, having no influence or a lesser influence on the measurement result. A sensor such as this is distinguished by a simple and space-saving mechanical design. In one modified embodiment, this sensor can be developed to form a differential-capacitor arrangement.

The invention is also achieved by a method for detection and/or measurement of oscillations using a sensor according to the invention, which is distinguished in that the first and the second spring-mass-damper oscillating systems oscillate in-phase in a frequency range below the second resonant frequency; wherein the first and the second spring-mass-damper oscillating systems have electrodes which oscillate in a measurement direction about electrode rest positions with electrode deflections which are equal to or proportional to deflections of the spring-mass-damper oscillators; wherein the first and the second spring-mass-damper oscillating systems are coupled to one another by means of at least one electrostatic field, which acts on the electrodes, forming at least one capacitance with the capacitance being governed by at least one electrode area, by at least one electrode coverage and by at least one electrode separation, with the electrode deflections influencing the electrode separation and/or the electrode coverage and thus influencing the magnitude of the capacitance, and with the influence of the first spring-mass-damper oscillating system on the magnitude of the capacitance being compensated for by the second spring-mass-damper oscillating system in the case of an in-phase oscillation, and with the magnitude of the capacitance being used as a sensor output variable.

The method therefore uses two spring-mass-damper oscillating systems which have different resonant frequencies. These two oscillating systems are arranged such that they oscillate in-phase when the oscillating systems are excited externally below the resonant frequencies. Either electrodes are provided directly on the oscillators in the oscillating systems, in which case the electrodes then oscillate with the same deflections as the oscillators themselves, or the electrodes are not provided directly on the oscillators, but, for example, are moved by levers with an amplitude which is proportional to the oscillators. The two oscillating systems are electrostatically coupled to one another, that is to say the electrodes in the oscillating systems are involved in the formation of a joint capacitance. The magnitude of the capacitance is influenced by the oscillation of the oscillators. In this case, by way of example, the oscillation amplitudes can be used to vary the electrode separations or to vary the electrode coverages.

In the method according to the invention, the influence of the spring-mass-damper oscillating systems on the capacitance is designed such that the two spring-mass-damper oscillating systems have an inverse influence on the capacitance, and such that the influence of the two oscillating systems on the capacitance is compensated for when they oscillate in-phase. This means that the capacitance becoming smaller as a result of the movement in one oscillating system is compensated for by the movement in the same sense in the other oscillating system, and the capacitance increase associated with this. The magnitude of the capacitance is in this case used as a sensor output variable. This output variable can then be used by introducing it into an appropriate electronic circuit. This measurement and detection method for oscillations results in a bandpass behavior. Excitation frequencies below and above the useable frequency band are effectively suppressed by the mechanical behavior of the oscillators themselves. Severe modulations on the capacitance occur, in contrast, only in the useable frequency band. The useable frequency band is between the two resonant frequencies of the oscillating systems. The bandpass behavior allows the method according to the invention to cover a wider frequency range than that with one resonant oscillating system. The measurement method, which intrinsically operates with low Q-factors over a broad frequency band, is distinguished by a very rapid stabilization and response behavior.

In one simple variant of the method according to the invention, this method is carried out such that the micromechanical sensor has a fixed-position comb electrode with fixed-position comb structures, wherein the first and the second spring-mass-damper oscillating systems have moving comb structures which engage in the fixed-position comb structures, with the arrangement of the fixed-position and the moving comb structures with respect to one another resulting, in the case of an in-phase oscillation, at the same time as an increase in the electrode separation and/or a reduction in the electrode coverage of the moving comb structures of the first spring-mass-damper oscillating system by and/or with the fixed-position comb structures, in a reduction in the electrode separation and/or an increase in the electrode coverage of the moving comb structures of the second spring-mass-damper oscillating system by and/or with the fixed-position comb structures, and with the moving comb structures being electrically conductively connected to one another.

In this variant of the method according to the invention, a fixed-position comb electrode is used and is intended to engage in the moving comb electrodes in the first and the second spring-mass-damper oscillating systems. The comb structures of the moving oscillators and of the fixed-position comb electrode are in this case arranged such that, in the case of an in-phase oscillation, at the same time as the increase in the electrode separation of the moving comb structures of one oscillator of the fixed-position comb structures, this results in a reduction in the electrode separation of the moving comb structures of the oscillator in the other spring-mass-damper oscillating system from the fixed-position comb structures. Instead of increasing and decreasing the separations between the comb structures, it is also possible to decrease and increase the electrode coverage. It is also possible to simultaneously vary the electrode separation and the electrode coverage. In any case, however, an in-phase oscillation of the first and second spring-mass-damper oscillating systems results in an increase in the capacitance produced by one spring-mass-damper oscillating system and in a reduction in the capacitance produced by the other spring-mass-damper oscillating system. Because the moving constructors are electrically conductively connected to one another and form a joint capacitance with the fixed-position comb structures, together with the design configuration of the two spring-mass-damper oscillating systems, this results in an increase in the capacitance produced by one spring-mass-damper oscillating system being compensated for overall by the reduction in the capacitance produced by the other spring-mass-damper oscillating system.

In one advantageous development of the method according to the invention for detection and/or measurement of oscillations, this method is designed such that the micromechanical sensor has the fixed-position comb electrode with fixed-position comb structures and a further fixed-position electrostatic comb electrode with further fixed-position comb structures, wherein the moving comb structures of the first and of the second spring-mass-damper oscillating systems engage between the fixed-position comb structures and the further fixed-position comb structures, with the arrangement of the fixed-position and moving comb structures with respect to one another and the central arrangement of the moving comb structures between the fixed-position comb structures and the further fixed-position comb structures resulting, in the case of an in-phase oscillation, at the same time as an increase in the electrode separation and/or a reduction in the electrode coverage of the moving comb structures of the first spring-mass-damper oscillating system by and/or with the fixed-position comb structures and as a reduction in the electrode separation and/or an increase in the electrode coverage of the moving comb structures of the first spring-mass-damper oscillating system by and/or with the further fixed-position comb structures, in a reduction in the electrode separation and/or an increase in the electrode coverage of the moving comb structures of the second spring-mass-damper oscillating system by and/or with the fixed-position comb structures, and an increase in the electrode separation and/or a reduction in the electrode coverage of the moving comb structures of the second spring-mass-damper oscillating system by and/or with the further fixed-position comb structures, with the moving comb structures being electrically conductively connected to one another.

In this method, further fixed-position comb structures are provided in addition to the fixed-position comb structures. The moving comb structures oscillate between the fixed-position comb structures and the further fixed-position comb structures. Two capacitances are formed in this case: the capacitance between the moving comb structures and the fixed-position comb structures, and the further capacitance between the moving comb structures and the further fixed-position comb structures. By way of example, depending on the instantaneous position of the moving comb structures, there is a short distance to the comb structures and therefore a high capacitance, or a short distance to the further comb structures and therefore a high further capacitance. In consequence, an advantageously high capacitance is available at all times. The comb structures are in this case arranged such that, when the first and second spring-mass-damper oscillating systems oscillate in-phase, the influence of the second spring-mass-damper oscillating system is the inverse of the influence of the first spring-mass-damper oscillating system on the capacitance and on the further capacitance, respectively. The proposed extended method is distinguished on the one hand by improved operation, while on the other hand this extended method also involves increased manufacturing effort for the sensors. The increased manufacturing effort results from the need to connect the further fixed-position comb structures to one another such that they are insulated from the fixed-position comb structures. By way of example, the further fixed-position comb structures are connected to one another by means of a complex and expensive further connecting level in the sensor.

In one alternative development of the method according to the invention, this method is designed such that the micromechanical sensor has a first fixed-position comb electrode with first fixed-position comb structures and a second fixed-position comb electrode with second fixed-position comb structures, wherein the first and the second spring-mass-damper oscillating systems have first and second moving comb structures, with the first moving comb structures engaging in the first fixed-position comb structures, and with the second moving comb structures engaging in the second fixed-position comb structures, with the arrangement of the first and second moving comb structures and of the first and second fixed-position comb structures with respect to one another resulting, in the case of an in-phase oscillation, at the same time as an increase in the electrode separation and/or a reduction in the electrode coverage of the first moving comb structures of the first spring-mass-damper oscillating system by and/or with the first fixed-position comb structures, in a reduction in the electrode separation and/or an increase in the electrode coverage of the first moving comb structures of the second spring-mass-damper oscillating system by and/or with the first fixed-position comb structures, a reduction in the electrode separation and/or an increase in the electrode coverage of the second moving comb structures in the first spring-mass-damper oscillating system by and/or with the second fixed-position comb structures, and an increase in the electrode separation and/or a reduction in the electrode coverage of the second moving comb structures of the second spring-mass-damper oscillating system by the second fixed-position comb structures, with all the moving comb structures being electrically conductively connected to one another.

In this refinement of the method, second moving comb structures are used in addition to the first moving comb structures. Second fixed-position comb structures are associated with the second moving comb structures. The second fixed-position comb structures carried out the same function as the further fixed-position comb structures in the last example described above. They are differential electrodes with respect to the first fixed-position comb structures. This means that, when the moving comb structures are moved away from the fixed-position comb structures, they approach the second fixed-position comb structures, and vice versa. In the embodiment proposed here, the first electrodes and the second electrodes are physically separated from one another. This allows both electrodes to be provided on one level, in a cost-effective manner.

As an alternative to that proposed above, in a further example of the method according to the invention, the method can also be carried out in that at least one of the spring-mass-damper oscillating systems in the micromechanical sensor has a mechanical coupling element and an electrostatic coupling electrode, with the mechanical coupling element stepping down or stepping up the oscillation amplitude of the spring-mass-damper oscillator in the spring-mass-damper oscillating system in the micromechanical sensor to a lower or higher oscillation amplitude of the electrostatic coupling electrode, and with the electrode in the other spring-mass-damper oscillating system and the electrostatic coupling electrode oscillating with respect to one another during an in-phase oscillation of the first and second spring-mass-damper oscillating systems with a constant electrode separation and constant electrode coverage.

In this variant, by way of example, the greater oscillation amplitude in the second spring-mass-damper oscillating system and the greater influence on the capacitance resulting from this are compensated for by the oscillation amplitude being stepped down with the aid of a mechanical coupling element to a lesser oscillation amplitude of a coupling electrode. Alternatively, the lesser oscillation amplitude in the first spring-mass-damper oscillating system could also be stepped up to a greater amplitude of a coupling electrode. In this method, it will be possible to read the sensor in an alternative manner on the mechanical coupling element and, for example, this could be done optically or piezo-resistively. This fourth variant of the method according to the invention can also be developed to form a differential-capacitor arrangement, in a further exemplary embodiment of the present invention.

In a further alternative of the method for detection and/or measurement of oscillations, the method is carried out in that at least one spring-mass-damper oscillator in the first spring-mass-damper oscillating system in the micromechanical sensor oscillates in a measurement direction on an oscillation plane and the second spring-mass-damper oscillating system in the micromechanical sensor has at least one spring-mass-damper oscillator which oscillates on the oscillation plane in an oblique direction, which is rotated at a rotation angle with respect to the measurement direction, with the rotated spring-mass-damper oscillator having comb electrodes which are parallel to the comb structures in the first spring-mass-damper oscillator, and a guide which allows it to oscillate in an oblique direction which is governed by the rotation angle, with the comb electrodes in the first and the second spring-mass-damper oscillating systems oscillating with a constant electrode separation and constant electrode coverage during an in-phase oscillation. In this method, the greater oscillation amplitude in the second spring-mass-damper oscillating system is also mechanically stepped down. In this embodiment, however, there is no need for the coupling element which is complex to manufacture, or for the coupling electrode, and the sensor is formed from relatively simple structures. In this method, the oscillator in the second spring-mass-damper oscillating system is arranged at a rotation angle with respect to the measurement direction and oscillation direction of the first spring-mass-damper oscillator. This vectorially subdivides the oscillation amplitude of the rotated oscillators into a component parallel to the measurement direction and a component at right angles to the measurement direction. In this case, the rotation angle is chosen to be sufficiently large that the vectorial component in the measurement direction has the desired magnitude. This variant of the method according to the invention could also be developed. For example, in a further variant of the method, a second oscillator can be provided in the second spring-mass-damper oscillating system, which second oscillator is arranged in mirror-image form with respect to the rotated oscillator, and is used to form a differential-capacitor arrangement.

The object of the present invention is furthermore achieved by a method for production of a micromechanical sensor according to the invention as described above, wherein the method is a surface-silicon technology, a silicon technology close to the surface, a silicon volume technology, an LIGA technology or a multi-component microscopic injection-molding method. The sensor according to the invention can be implemented in widely differing forms. In this case, the sensor has no features which can be provided only by one specific micromechanical technology. The sensor can therefore be manufactured using all micromechanical technologies, for example using those mentioned.

BRIEF DESCRIPTION OF THE SEVERAL VIEWS OF THE DRAWING

The present invention will be explained in more detail in the following text with references to figures, in which.

DESCRIPTION OF THE INVENTION

Figure 1:
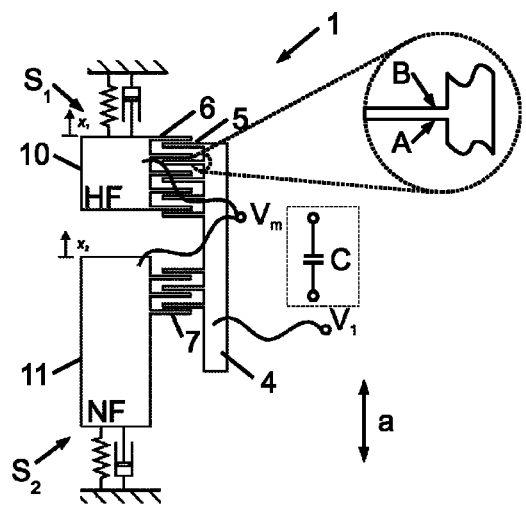
FIG. 1 shows an outline sketch of a first exemplary embodiment of a sensor according to the invention.

FIG. 1 schematically illustrates one simple exemplary embodiment of a sensor 1 according to the invention. In this case, the sensor 1 has two spring-mass-damper oscillating systems $S_1$ and $S_2$. The springs and dampers in the spring-mass-damper oscillating systems $S_1$ and $S_2$ are sketched schematically, with self-explanatory symbols. For the sake of simplicity, the spring-mass-damper oscillating systems are referred to in the following text as oscillating systems and the spring-mass-damper oscillators that are used are referred to as oscillators.

In the exemplary embodiment shown in FIG. 1, the oscillating system $S_1$ has only one oscillator 10. The oscillating system $S_2$ has the oscillator 11. The oscillating system $S_1$ is characterized by a high resonant frequency than that of the oscillating system $S_2$. Because of its higher resonant frequency, the oscillator 10 is annotated HF and the oscillator 11 is annotated NF because of its lower resonant frequency. In order to achieve the higher resonant frequency, the oscillator 10 is designed to have a smaller mass and smaller geometric dimensions than the oscillator 11.

The oscillators 10 and 11 are mounted such that they can oscillate in the direction a. The oscillators 10 and 11 are excited in the direction a by an external excitation oscillation. In this case, an amplitude $x_1$ occurs at the oscillator 10 and an amplitude $x_2$ at the oscillator 11 at the observation time, which amplitudes are not to scale but are illustrated in order to allow them to be identified. At excitation frequencies which are well below the resonant frequency of the oscillator 11, the oscillators 10 and 11 oscillate in-phase. The oscillator 10 has moving comb structures 6, and the oscillator 11 has moving comb structures 7. Because the comb structures 6 and 7 are connected directly to the oscillators 10 and 11, the moving comb structures in this case oscillate in the same way as the movement of the oscillators 10 and 11.

The moving comb structures 6 and 7 engage in the fixed-position comb electrode 4 with fixed-position comb structures 5. The rest position of the comb structures 6 and 7 is located eccentrically with respect to the center between the fixed-position comb structures 5. The comb structures 5, 6, 7 can be considered to be two-dimensional plates, one of whose dimensions extends out of the plane of the illustration. Comb structures which are opposite a short distance apart and are at electrical potentials form capacitances. The oscillators 10 and 11 are electrically conductively connected to one another, as a result of which the moving electrodes 6 and 7 are at the potential $V_m$ at the observation time. The capacitance C is formed in the sensor 1 by the position of the fixed-position comb electrode 4, which is at a potential $V_1$, with respect to the oscillators 10 and 11 with moving comb structures 6 and 7, which are at a common potential $V_m$.

The capacitance C is influenced not only by the separations between the fixed-position comb structures 5 and the moving comb structures 6 but also by the separations between the fixed-position comb structures 5 and the moving comb structures 7. An enlarged detail of a fixed-position comb structure 5 is illustrated in FIG. 1. The comb structures 5 have two sides A and B. In the sensor 1 according to the invention, the moving comb structures 6 are arranged on the side B of the fixed-position comb structures 5, and the moving comb structures 7 are arranged on the side A of the fixed-position comb structures 5. This means that the separation between the comb structures 6 and the comb structures 5 on the side B is less than the separation between the comb structures 6 and the side A of the comb structures 5 and that the separation between the moving comb structures 7 is less to the side A of the comb structures 5 than to the side B of the comb structures 5. When the oscillator 10 is deflected from its rest position with an amplitude $x_1$, the separation between the comb structures 5 and the moving comb structures 6 is increased. This reduces the capacitance between the comb structures 5 and 6, and this capacitance element of the oscillating system $S_1$ within the capacitance C becomes less. The moving comb structures 7 of the oscillator 11 are arranged on the other side A of the fixed-position comb structures 5. Deflection of the oscillator 11 with an amplitude $x_2$ leads to a reduction in the separations between the moving comb structures 7 and the fixed-position comb structures 5, and the proportion of the capacitance C of the oscillating system $S_2$ within the capacitance C becomes greater. In this way, when the oscillators 10 and 11 are oscillating in phase, the oscillating system $S_1$ and $S_2$ have an inverse influence on the magnitude of the capacitance C.

In-phase oscillations occur at frequencies below the resonant frequency of the oscillator 11 and above the resonant frequency of the oscillator 10. At these frequencies, the oscillation amplitude $x_2$ of the oscillator 11 is greater than the oscillation amplitude $x_1$ of the oscillator 10. If the oscillators 10 and 11 were to be equipped with the same number of comb structures of the same size, the oscillator 11 would change the capacitance C to a greater extent than the oscillator 10, because of its greater oscillation amplitude. In the sensor according to the invention, the influence of the first and of the second spring-mass-damper oscillating systems on the magnitude of the capacitance is, however, compensated for. The compensation is achieved in the micromechanical sensor 1 by using a greater number of moving comb structures 6 than moving comb structures 7. The illustrated number of three comb structures 7 and five comb structures 6 is intended only for illustrative purposes, and to assist clarity. In reality sensors generally use a much greater number of comb structures.

Figure 2:
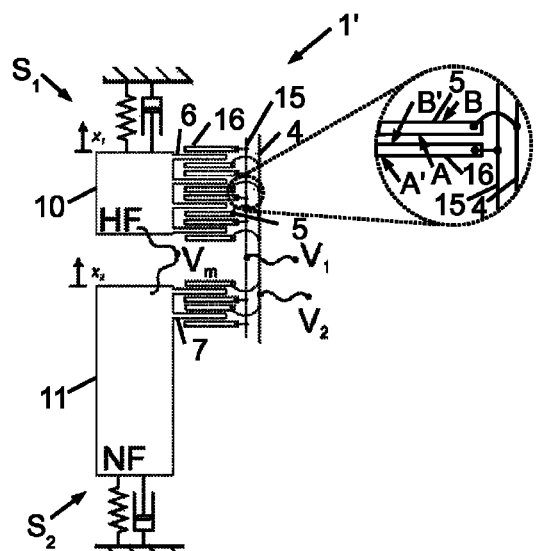
FIG. 2 shows an outline sketch of one development of the sensor according to the invention shown in FIG. 1, according to a second exemplary embodiment of the present invention.

FIG. 2 schematically illustrates a sensor 1', which can be considered to be a development of the sensor 1 shown in FIG. 1. Components of the sensor 1' with the same reference symbols as in FIG. 1 have the same function, and have already been described with reference to FIG. 1. As an extension to the micromechanical sensor 1, the micromechanical sensor 1' has a fixed-position comb electrode 15 with further fixed-position comb structures 16. The further fixed-position comb structures 16 have the two sides A' and B', which are annotated analogously to the two sides A and B of the fixed-position comb structures 5. The further fixed-position comb electrode 15 is used in a similar manner to the fixed-position comb electrode 4 as an opposing electrode for both oscillating systems $S_1$ and $S_2$. In their rest position, the moving comb structures 6 are arranged in the center between the fixed-position comb structures 5 and the further fixed-position comb structures 16. In their rest position, the moving comb structures 7 are likewise arranged in the center between the comb structures 5 and 16. The further fixed-position comb electrode 15 is at the potential $V_2$ at the observation time, and a further capacitance is formed between the potential $V_2$ and the potential $V_m$ on the oscillators. This arrangement is a differential-capacitor arrangement. If the oscillator 10 has an amplitude $x_1$, the separation between the moving comb structures 6 and the fixed-position comb structures 5 is greater than when in the rest position, and the capacitance between the comb structures 5 and 6 is correspondingly reduced. At the same time, the separation between the moving comb structures 6 and the further fixed-position comb structures 16 has been reduced, and the capacitance between the comb structures 6 and 16 has been correspondingly increased. The fixed-position comb structures 5 and the further fixed-position comb structures 16 are arranged in mirror-image form in the vicinity of the moving comb structures 7. This means that, at the amplitude $x_2$, with respect to the amplitude $x_1$, the separation between the comb structures 7 and 5 has been increased in relation to the rest position, and the separation between the comb structures 7 and 16 has been reduced.

The moving comb structures 6 and 7 in the sensor 1' are always a short distance away from one of the fixed-position comb structures 5 or 16. This is advantageous for the operation of the sensor 1'. The functional advantage of the sensor 1' is counteracted by a disadvantage from the production point of view. Because of the physical proximity of the comb electrodes 4 and 15, it is not possible to produce both comb electrodes 4 and 15 as simple spatial bodies on the same level as that where the comb structures 5 and 16 are also formed. Instead of this, a more complex contact-making process must be provided for at least one of the fixed-position comb electrodes 4, 15. This additional connection is provided in the sensor 1' via a connecting level which is located parallel to the plane of the drawing, and also cannot be illustrated two-dimensionally. Contrary to the rest of the illustration, the electrical contact is made with the comb structures as sketched by circuitry lines.

Figure 3:
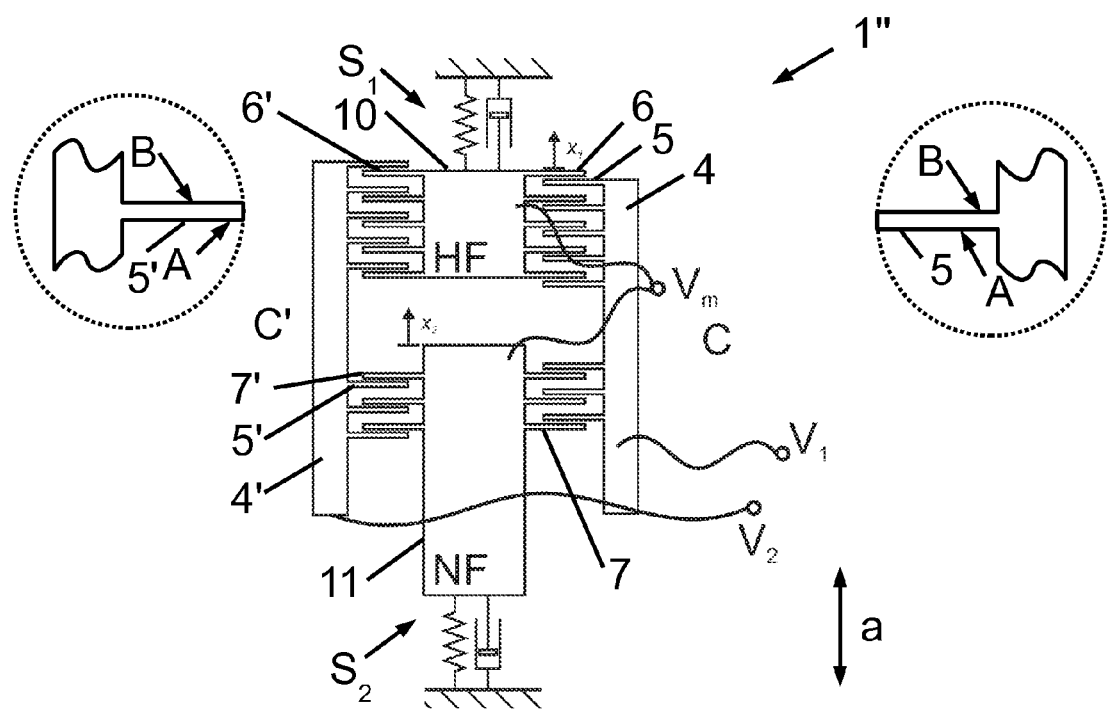
FIG. 3 shows a further preferred development of the sensor according to the invention, according to a third exemplary embodiment of the present invention.

FIG. 3 shows a further alternative micromechanical sensor 1" according to the invention. The sensor 1" is a preferred development of the sensor 1 shown in FIG. 1. In the sensor 1", the oscillator 10 has second moving comb structures 6', in addition to the first moving comb structures 6. Analogously, the low-frequency oscillator 11 has second moving comb structures 7', in addition to the first moving comb structures 7. The second moving comb structures 6' and 7' engage in a second fixed-position comb electrode 4'. The second fixed-position comb electrode 4' has second fixed-position comb structures 5', whose sides are annotated A and B, in the same way as the sides of the fixed-position comb structures 5. The sensor 1" is a different type of differential-capacitor arrangement, in which the oscillators 10 and 11 with the fixed-position electrode 4 form a capacitance as already described with reference to FIG. 1. In addition, in this case, the oscillators 10 and 11 form a second capacitance with the second fixed-position electrode 4'. In this case, the comb structures 5, 6, 5', 6', 7, 7' are arranged such that, when one oscillator moves, its influence on the magnitudes of the capacitances C and C' is inverse. This means that the moving comb structures are each arranged on the other side of the fixed-position comb structures. The moving comb structures 6 are arranged on the side B of the fixed-position comb structures 5, and the moving comb structures 6' are arranged on the side A of the comb structures 5', while the comb structures 7 are arranged on the side A of the comb structures 5', and the moving comb structures 7' are arranged on the side B of the fixed-position comb structures 5. In the sensor 1", the fixed-position comb electrodes 4 and 4' are physically separated from one another. This allows the fixed-position comb electrodes 4 and 4' to be manufactured on the same level. The sensor 1" is a functionally advantageous differential-capacitor arrangement which can be produced cost-effectively. The sensor 1" is therefore a preferred embodiment of the present invention.

Figure 4:
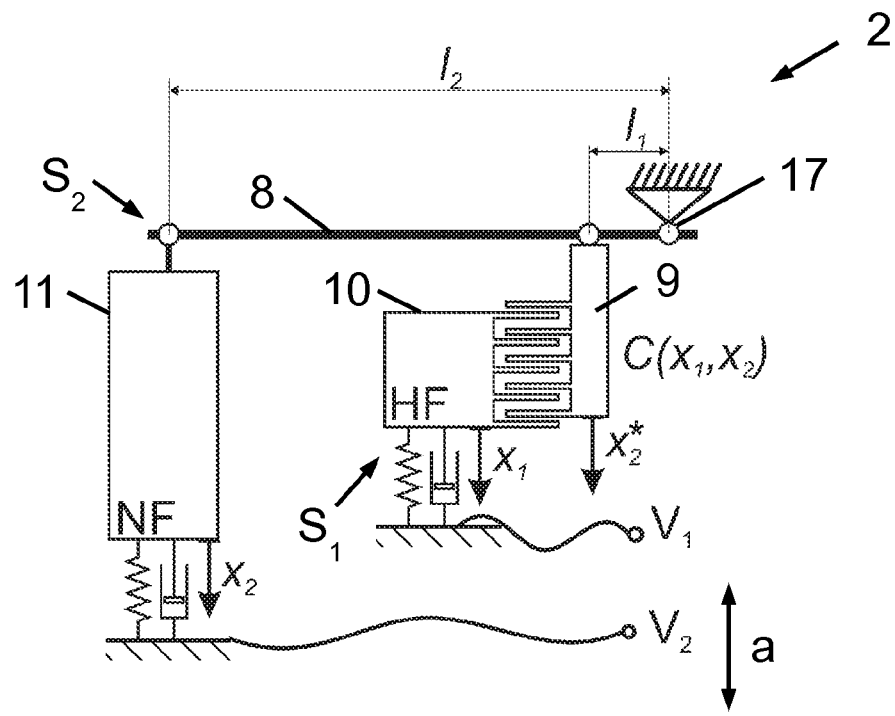
FIG. 4 shows an outline sketch of an alternative sensor according to a fourth exemplary embodiment of the present invention.

FIG. 4 schematically illustrates an alternative sensor 2 according to the invention. The greater oscillator amplitude of the low-frequency oscillator 11 is in this case stepped down to a lower amplitude of an electrostatic coupling element 9 by means of a mechanical coupling element 8. The step-down ratio is governed by the ratio of the lever length $l_1$, the length between a lever fulcrum 17 and the electrostatic coupling electrode 9, and $l_2$, the length between the lever fulcrum 17 and the low-frequency oscillator 11. The movement of the electrostatic coupling electrode 9 is proportional to the movement of the oscillator 11, and its amplitude is matched to the amplitude of the oscillator 10. When the coupling electrode 9 and the oscillator 10 are oscillating in phase, the capacitance between the coupling electrode 9 and the oscillator 10 is therefore constant.

Figure 5:
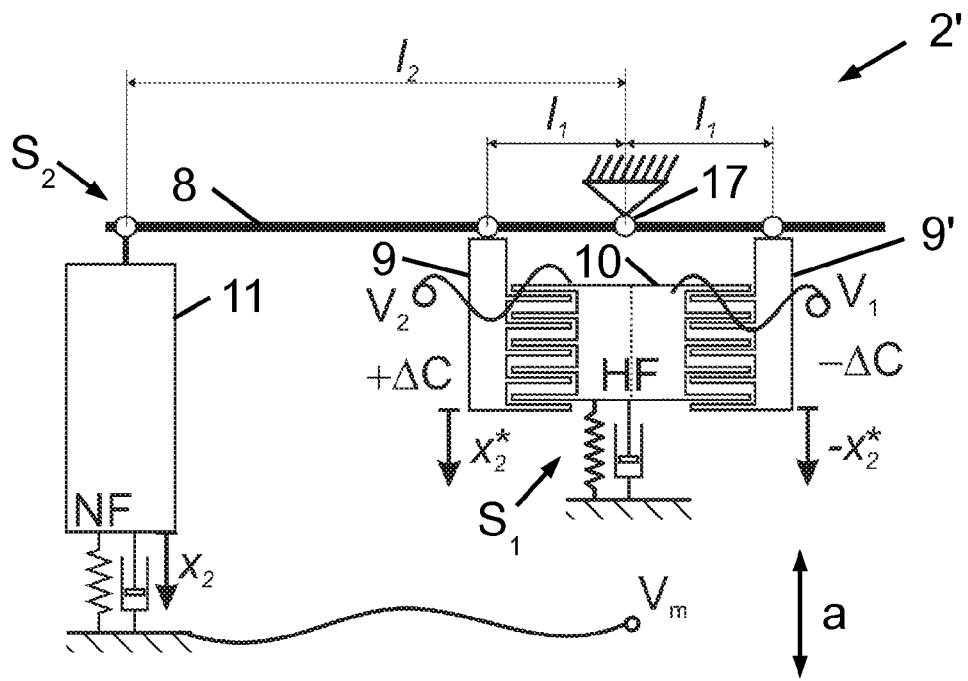
FIG. 5 shows an outline sketch of a developed sensor according to a fifth exemplary embodiment of the present invention.

FIG. 5 schematically illustrates a developed micromechanical sensor 2' according to the invention, which can be considered to be an extension of the sensor 2 shown in FIG. 4. The mechanical coupling element 8 for this sensor is lengthened beyond the fulcrum. The movement direction beyond the fulcrum 17 from the oscillator 11 on the coupling element is inverted. A further coupling electrode 9' is arranged symmetrically with respect to the fulcrum, in addition to the coupling electrode 9. While the movement of the coupling electrode 9 is proportional to the movement of the oscillator 11, the coupling electrode 9' moves inversely proportionally to the oscillator 11. The oscillator 10 has first and second moving comb structures, which are electrically insulated from one another and are connected at the observation time to the potentials $V_1$ and $V_2$ and which, together with the coupling electrodes 9 and 9', form a capacitance and a second capacitance and, overall, a differential-capacitor arrangement.

Figure 6:
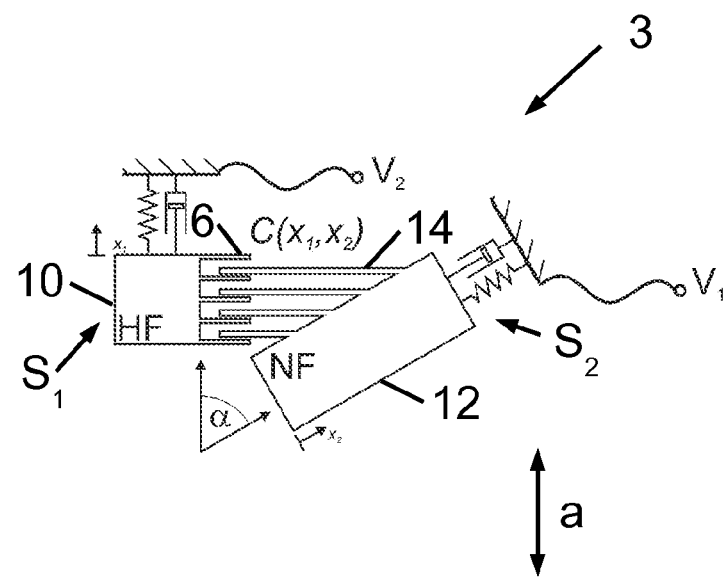
FIG. 6 shows an outline sketch of an alternative sensor according to a sixth exemplary embodiment of the present invention.

FIG. 6 shows a schematic illustration of a micromechanical sensor 3 according to a further exemplary embodiment of the present invention. In the sensor 3, the low-frequency oscillator 12 in the spring-mass-damper oscillating system $S_2$ is arranged at a rotation angle α with respect to the oscillator 10 in the spring-mass-damper oscillating system $S_1$. The deflection $x_2$ of the oscillator 12 can be represented as a vectorial subdivision into a deflection in the measurement direction a and a component at right angles to this. The vectorial subdivision of the deflection $x_2$ is technically implemented by orienting the comb structures 14 of the oscillator 12 with their normal to the surface in the measurement direction a. In order to ensure that the oscillator 12 is deflected in the direction $x_2$ and not in the measurement direction a, the oscillator 12 has appropriate guides, which are not illustrated here. In the sensor 3, not only is the separation between the comb structures 6 and 14 varied during oscillation of the oscillators, but, additionally, the electrode coverage as well. In this case, however, the electrode separation has a considerably greater influence on the magnitude of the capacitance C than the electrode coverage. In the sensor 3, the greater mechanical sensitivity of the low-frequency oscillator 12 is reduced in a simple and cost-effective manner to the lesser mechanical sensitivity of the high-frequency oscillator 10. The sensor 3 can also be provided on a small area, since it does not require any area-consuming auxiliary structures.

Figure 7:
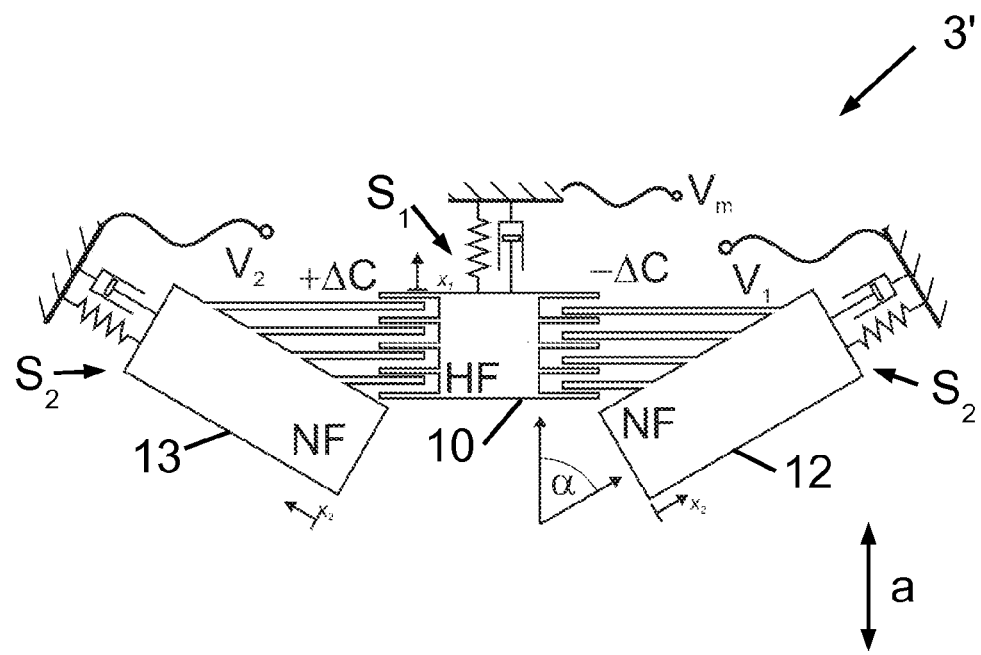
FIG. 7 shows an outline sketch of a developed sensor according to a seventh exemplary embodiment of the present invention.

FIG. 7 schematically illustrates a further sensor 3' according to the invention, which is a development of the sensor 3 shown in FIG. 6. The sensor 3' is a differential-capacitance arrangement, in which a low-frequency oscillator 12 is arranged such that it rotates and, with the high-frequency oscillator 10, forms a first capacitance. A further rotated oscillator 13 is provided in the sensor 3', with mirror-image symmetry with respect to the oscillator 12, and, with the high-frequency oscillator 10, forms a second capacitance. The comb structures of the oscillators 12 and 13 are provided on opposite sides of the comb structures of the oscillator 10. A deflection of the oscillator 12 when the oscillator 10 is stationary therefore results in a reduction in the capacitance, and deflection of the oscillator 13 in the direction $x_2$ results in an increase in the second capacitance. This results in the advantages as already described of a differential-capacitor arrangement. The symmetrical arrangement of two oscillators 12 and 13 prevents the sensor 3' from being unbalanced in the direction at right angles to a on the plane of the illustration. By way of example, this can have an advantageous effect on the life of the sensor 3'.

Figure 8:
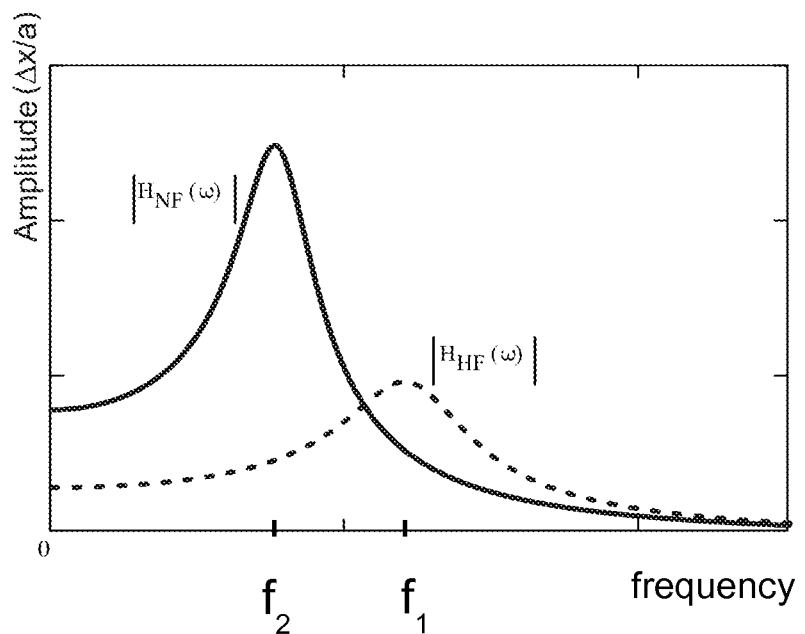
FIG. 8 shows a diagram illustrating the mechanical sensitivities as a function of excitation frequencies of oscillators in the sensor according to the invention with different resonant frequencies.

FIG. 8 uses a diagram to schematically illustrate essential features of the mechanical sensitivities of the two oscillating systems $S_1$, $S_2$ which are used in sensors according to the invention. The oscillators in the oscillating systems $S_1$, $S_2$ are excited optimally at their resonant frequencies $f_1$ and $f_2$. At these frequencies, the oscillators achieve their maximum amplitude for a constant excitation amplitude. The resonant frequencies can be seen at the maxima of the sensitivity curves on the diagram. At low frequencies, which can be read on the left-hand ordinate in the diagram shown as a sketch, the sensitivity of the low-frequency oscillator is considerably greater than that of the high-frequency oscillator. At frequencies above the resonant frequency, the mechanical sensitivity of the oscillators decreases to a greater extent at frequencies below the resonant frequencies. In consequence, the differences between the oscillation amplitudes of high-frequency and low-frequency oscillators are also, when considered in absolute form, at high excitation frequencies. These sensitivities at excitation frequencies above the resonant frequencies can be read on the right-hand ordinate. Because of the large difference between the oscillation amplitudes at low frequencies, compensation for the different oscillation amplitudes is provided in the sensor according to the invention, with the aim of equalizing the influences of the two oscillating systems on the capacitance.

Figure 9:
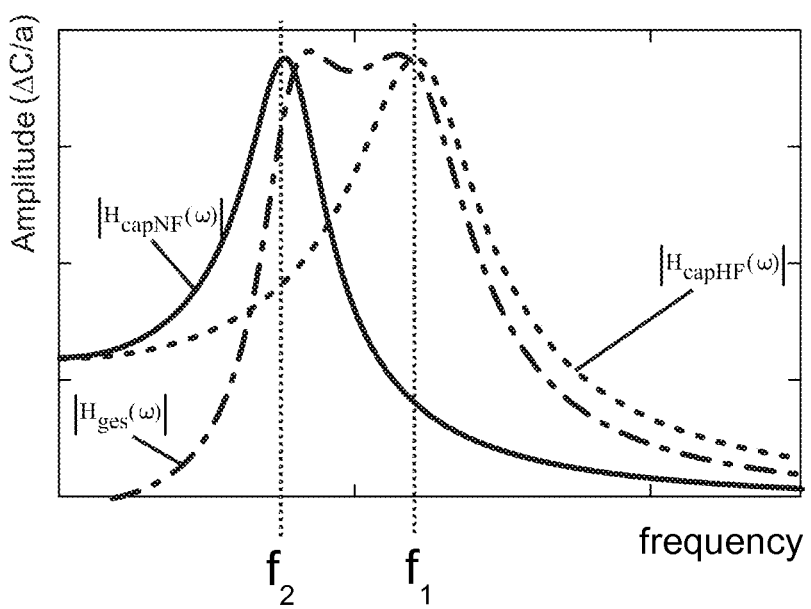
FIG. 9 shows a diagram which illustrates the capacitive sensitivities of individual oscillators and of the sensor according to the invention, as a function of the excitation frequency.

FIG. 9 shows the capacitive sensitivity of a high-frequency spring-mass-damper oscillating system $|H_{capHF}(\omega)|$, the capacitive sensitivity $|H_{capNF}(\omega)|$ of a low-frequency spring-mass-damper oscillating system, and the capacitive sensitivity $|H_{tot}(\omega)|$ of a sensor according to the invention, as a function of the frequency. The curves $|H_{capNF}(\omega)|$ and $|H_{capNF}(\omega)|$ represent the capacitance changes in the capacitance elements in the oscillating systems $S_1$ and $S_2$, with the electronic coupling of the two oscillating systems being deactivated for measurement purposes. This curve is scaled in a visually similar form to the curve of the mechanical sensitivity in FIG. 8. The dashed line $|H_{capHF}(\omega)|$ represents the capacitive sensitivity of the high-frequency oscillating system $S_1$. The mechanical sensitivities of this high-frequency oscillating system are matched to the capacitive sensitivities of the low-frequency oscillator both in the low-frequency range and in the area of the maximum. This means that the influences of the high-frequency and low-frequency spring-mass-damper oscillating systems on the capacitance are matched to one another, according to the invention. The dashed-dotted line $|H_{tot}(\omega)|$ indicates the capacitive sensitivity of the entire sensor. At low frequencies, the influence of the high-frequency oscillating system and the low-frequency oscillating system is compensated for, and the resultant total capacitive sensitivity of the sensor is zero. This means that low-frequency excitation frequencies are effectively suppressed in the sensor according to the invention.

In practice, low-frequency interference is particularly important, since this occurs with high amplitudes. Good suppression of low-frequency excitation frequencies is therefore a characteristic which can be considered highly advantageous for the sensors according to the invention. The sensor according to the invention reaches its maximum capacitive sensitivity in a frequency band which is defined substantially by the two resonant frequencies $f_1$ and $f_2$ of the two oscillating systems $S_1$, $S_2$. A sensor according to the invention can advantageously be combined with optimized evaluation electronics, based on mechanical filtering, by effectively evaluating available measurement variables, without having to take account of low-frequency interference signals.

The invention claimed is:

1. A micromechanical sensor having at least two spring-mass-damper oscillators which can be excited by a common external oscillation, with the micromechanical sensor having a first spring-mass-damper oscillating system with a first resonant frequency and a second spring-mass-damper oscillating system with a second resonant frequency which is lower than the first resonant frequency, wherein the first and the second spring-mass-damper oscillating systems are designed such that they oscillate in-phase in a frequency range below the second resonant frequency; wherein the first and the second spring-mass-damper oscillating systems have electrodes which oscillate in a measurement direction about electrode rest positions with electrode deflections which are equal to or proportional to deflections of the spring-mass-damper oscillators; wherein the first and the second spring-mass-damper oscillating systems are coupled to one another by means of at least one electrostatic field, which acts on the electrodes, forming at least one capacitance with the capacitance being governed by at least one electrode area and by at least one electrode separation and/or an electrode coverage, with the electrode deflections influencing the electrode separation and/or the electrode coverage and thus influencing the magnitude of the capacitance, and with the influences of the first and second spring-mass-damper oscillating systems on the magnitude of the capacitance being compensated for in the case of an in-phase oscillation.

2. The micromechanical sensor as claimed in claim 1, wherein the micromechanical sensor has a fixed-position comb electrode with fixed-position comb structures, wherein the first and the second spring-mass-damper oscillating systems have moving comb structures which engage in the fixed-position comb structures, with the moving comb structures of the first spring-mass-damper oscillating system being arranged on a second side of the fixed-position comb structures, and with the moving comb structures of the second spring-mass-damper oscillating system being arranged on a first side of the fixed-position comb structures, and with all the moving comb structures being electrically conductively connected to one another.

3. The micromechanical sensor as claimed in claim 2, wherein the micromechanical sensor has the fixed-position comb electrode with fixed-position comb structures and a further fixed-position comb electrode with further fixed-position comb structures, wherein the moving comb structures of the first and of the second spring-mass-damper oscillating systems engage between the fixed-position comb structures and the further fixed-position comb structures, with the moving comb structures of the first spring-mass-damper oscillating system being arranged on the second side of the fixed-position comb structures and on a first side of the further fixed-position comb structures and with the moving comb structures of the second spring-mass-damper oscillating systems being arranged on the first side of the fixed-position comb structures and on the second side of the further fixed-position comb structures, and with all the moving comb structures being electrically conductively connected to one another.

4. The micromechanical sensor as claimed in claim 2, wherein the micromechanical sensor has a first fixed-position comb electrode with first fixed-position comb structures and a second fixed-position comb electrode with second fixed-position comb structures, between which the first and the second spring-mass-damper oscillating systems are arranged, with first moving comb structures of the first spring-mass-damper oscillating system being arranged on the second side of the first fixed-position comb structures, with second moving comb structures of the first spring-mass-damper oscillating system being arranged on a first side of the second fixed-position comb structures, with first moving comb structures of the second spring-mass-damper oscillating system being arranged on the first side of the first fixed-position comb structures, and with second moving comb structures of the second spring-mass-damper oscillating system being arranged on the second side of the second fixed-position comb structures.

5. The micromechanical sensor as claimed in claim 2, wherein the first spring-mass-damper oscillating system has a greater number of fixed-position and moving comb structures than the second spring-mass-damper oscillating system.

6. The micromechanical sensor as claimed in claim 1, wherein the first spring-mass-damper oscillating system has at least two spring-mass-damper oscillators.

7. The micromechanical sensor as claimed in claim 1, wherein, in the case of the micromechanical sensor, one of the spring-mass-damper oscillating systems has a mechanical coupling element and an electrostatic coupling electrode, with the mechanical coupling element being designed for stepping down or stepping up the oscillation amplitude of one spring-mass-damper oscillator in this spring-mass-damper oscillating system to a lower or higher oscillation amplitude of the electrostatic coupling electrode, and with the oscillation amplitude of the other spring-mass-damper oscillating system and of the electrostatic coupling electrode being of equal magnitude in the case of an in-phase oscillation.

8. The micromechanical sensor as claimed in claim 1, wherein, in the case of the micromechanical sensor, at least one spring-mass-damper oscillator in the first spring-mass-damper oscillating system oscillates in a measurement direction on an oscillation plane, and wherein the second spring-mass-damper oscillating system has at least one spring-mass-damper oscillator which is rotated to a rotation angle with respect to the measurement direction on the oscillation plane, with the rotated spring-mass-damper oscillator having comb structures, which are parallel to the comb structures of the first spring-mass-damper oscillator, and a guide which allows it to oscillate in an oblique direction which is governed by the rotation angle, with the oscillation amplitude of the rotated spring-mass-damper oscillator in the case of an in-phase oscillation having a vector component in the measurement direction which is of equal magnitude to the oscillation amplitude of the spring-mass-damper oscillator in the first spring-mass-damper oscillating system.

9. The micromechanical sensor as claimed in claim 1, wherein the micromechanical sensor has the characteristics of being produced by one of a surface-silicon technology, a silicon technology close to the surface, a silicon volume technology, an LIGA technology or a multi-component microscopic injection-molding method.

10. A method for detection and/or measurement of oscillations by means of a micromechanical sensor with at least two spring-mass-damper oscillators which are excited by a common external oscillation, with the micromechanical sensor having a first damped spring-mass-damper oscillating system with a first resonant frequency and a second damped spring-mass-damper oscillating system with a second resonant frequency, which is lower than the first resonant frequency, the method comprising:
 oscillating the first and the second spring-mass-damper oscillating systems in-phase in a frequency range below the second resonant frequency;
 oscillating electrodes of the first and the second spring-mass-damper oscillating systems in a measurement direction about electrode rest positions with electrode deflections which are equal to or proportional to deflections of the spring-mass-damper oscillators;
 coupling the first and the second spring-mass-damper oscillating systems to one another by means of at least one electrostatic field, which acts on the electrodes, forming at least one capacitance governed by at least one electrode area, by at least one electrode coverage and/or by at least one electrode separation, with the electrode deflections influencing the electrode separation and/or the electrode coverage and thus influencing a magnitude of the capacitance, and compensating the influence of the first spring-mass-damper oscillating system on the magnitude of the capacitance by the second spring-mass-damper oscillating system in the case of a synchronous oscillation, and using the magnitude of the capacitance as a sensor output variable.

11. The method as claimed in claim 10, further comprising: providing the micromechanical sensor with a fixed-position comb electrode having fixed-position comb structures, providing the first and the second spring-mass-damper oscillating systems with moving comb structures which engage in the fixed-position comb structures, arranging the fixed-position and the moving comb structures with respect to one another resulting in, in the case of an in-phase oscillation, at the same time as an increase in the electrode separation and/or a reduction in the electrode coverage of the moving comb structures of the first spring-mass-damper oscillating system by and/or with the fixed-position comb structures, in a reduction in the electrode separation and/or an increase in the electrode coverage of the moving comb structures of the second spring-mass-damper oscillating system by and/or with the fixed-position comb structures, and electrically conductively connecting the moving comb structures being to one another.

12. The method as claimed in claim 11, wherein the micromechanical sensor has the fixed-position comb electrode with fixed-position comb structures and a further fixed-position electrostatic comb electrode with further fixed-position comb structures, wherein the moving comb structures of the first and of the second spring-mass-damper oscillating systems engage between the fixed-position comb structures and the further fixed-position comb structures, further comprising:
 arranging the fixed-position and moving comb structures with respect to one another and arranging the moving comb structures centrally between the fixed-position comb structures and the further fixed-position comb structures resulting, in the case of an in-phase oscillation, at the same time as an increase in the electrode separation and/or a reduction in the electrode coverage of the moving comb structures of the first spring-mass-damper oscillating system by and/or with the fixed-position comb structures and as a reduction in the electrode separation and/or an increase in the electrode coverage of the moving comb structures of the first spring-mass-damper oscillating system by and/or with the further fixed-position comb structures, in a reduction in the electrode separation and/or an increase in the electrode coverage of the moving comb structures of the second spring-mass-damper oscillating system by and/or with the fixed-position comb structures, and an increase in the electrode separation and/or a reduction in the electrode coverage of the moving comb structures of the second spring-mass-damper oscillating system by and/or with the further fixed-position comb structures, and electrically conductively connecting the moving comb structures to one another.

13. The method as claimed in claim 11, wherein the micromechanical sensor has a first fixed-position comb electrode with first fixed-position comb structures and a second fixed-position comb electrode with second fixed-position comb structures, wherein the first and the second spring-mass-damper oscillating systems have first and second moving comb structures, with the first moving comb structures engaging in the first fixed-position comb structures, and with the second moving comb structures engaging in the second fixed-position comb structures, further comprising: arranging the first and second moving comb structures and of the first and second fixed-position comb structures with respect to one another resulting, in the case of an in-phase oscillation, at the same time as an increase in the electrode separation and/or a reduction in the electrode coverage of the first moving comb structures of the first spring-mass-damper oscillating system by and/or with the first fixed-position comb structures, in a reduction in the electrode separation and/or an increase in the electrode coverage of the first moving comb structures of the second spring-mass-damper oscillating system by and/or with the first fixed-position comb structures, a reduction in the electrode separation and/or an increase in the electrode coverage of the second moving comb structures in the first spring-mass-damper oscillating system by and/or with the second fixed-position comb structures, and an increase in the electrode separation and/or a reduction in the electrode coverage of the second moving comb structures of the second spring-mass-damper oscillating system by the second fixed-position comb structures, and electrically conductively connecting all the moving comb structures to one another.

14. The method as claimed in claim 10, further comprising: providing at least one of the spring-mass-damper oscillating systems in the micromechanical sensor with a mechanical coupling element and an electrostatic coupling electrode, stepping down or stepping up the oscillation amplitude of the spring-mass-damper oscillator in the spring-mass-damper oscillating system in the micromechanical sensor with the mechanical coupling element to a lower or higher oscillation amplitude of the electrostatic coupling electrode, and oscillating the electrode in the other spring-mass-damper oscillating system and the electrostatic coupling electrode with respect to one another during an in-phase oscillation of the first and second spring-mass-damper oscillating systems with a constant electrode separation and constant electrode coverage.

15. The method as claimed in claim 10, further comprising: oscillating at least one spring-mass-damper oscillator in the first spring-mass-damper oscillating system in the micromechanical sensor in a measurement direction on an oscillation plane and oscillating at least one spring-mass-damper oscillator of the second spring-mass-damper oscillating system in the micromechanical sensor on the oscillation plane in an oblique direction, which is rotated at a rotation angle with respect to the measurement direction, with the rotated spring-mass-damper oscillator having comb electrodes which are parallel to the comb structures in the first spring-mass-damper oscillator, and a guide which allows it to oscillate in an oblique direction which is governed by the rotation angle, and oscillating the comb electrodes in the first and the second spring-mass-damper oscillating systems with a constant electrode separation and constant electrode coverage during an in-phase oscillation.

\* \* \* \* \*